United States Patent

Shiraishi et al.

Patent Number: 5,625,383
Date of Patent: Apr. 29, 1997

[54] DEVICE AND METHOD FOR GENERATING READ ADDRESSES FOR VIDEO MEMORY

[75] Inventors: Toshihiro Shiraishi; Katsuakira Moriwake, both of Kanagawa, Japan

[73] Assignee: Sony Corporation, Tokyo, Japan

[21] Appl. No.: 674,616

[22] Filed: Jul. 3, 1996

Related U.S. Application Data

[63] Continuation of Ser. No. 226,936, Apr. 13, 1994, abandoned.

[30] Foreign Application Priority Data

Apr. 15, 1993 [JP] Japan .................................. 5-112094

[51] Int. Cl.$^6$ ........................................... G09G 5/36
[52] U.S. Cl. ............................................. 345/200
[58] Field of Search .............................. 345/190, 200

[56] References Cited

U.S. PATENT DOCUMENTS

| 4,648,049 | 3/1987 | Dines et al. | 345/190 |
| 5,051,734 | 9/1991 | Lake, Jr. | 345/190 |
| 5,225,824 | 7/1993 | Yamamoto et al. | 345/190 |

FOREIGN PATENT DOCUMENTS

| 0437074 | 7/1991 | European Pat. Off. . |
| 2164520 | 3/1986 | United Kingdom . |

OTHER PUBLICATIONS

WPI Abstract Acc No: 93–023134/03 and JP 04 351078 A (NEC) see abstract.

*Primary Examiner*—Jeffery Brier
*Attorney, Agent, or Firm*—William S. Frommer; Alvin Sinderbrand

[57] ABSTRACT

A read address generator for generating read addresses for a read memory wherein input read addresses indicated using an orthogonal coordinate system is converted into equivalent addresses in a polar coordinate system; the polar coordinate system is divided into concentric blocks according to distances from the pole of the polar coordinate system; vectors having sequentially increasing or decreasing angles are set for the concentric block; coordinate values indicated by the vectors are converted into second equivalent coordinate values in the orthogonal coordinate system; and output read addresses are generated by subtracting the second coordinate values from the input read addresses indicated in said orthogonal coordinate system and are supplied to the video memory.

8 Claims, 6 Drawing Sheets

DEVICE AND METHOD FOR GENERATING READ ADDRESSES FOR VIDEO MEMORY

This application is a continuation of application Ser. No. 08/226,936, filed Apr. 13, 1994, now abandoned

BACKGROUND OF THE INVENTION

1. Field of the Invention

The present invention relates to a device and a method for generating read addresses for a video memory and, more particularly, to a device and a method for generating read addresses for a video memory which are preferably used for a video special effect apparatus.

2. Description of the Prior Art

Video special effect apparatuses for performing video special effect processes on video signals are known from, for example, U.S. Pat. No. 4,791,581. In this type of video special effect apparatus, video signals are subjected to video special effect processes such as switching scenes in a manner which seems like turning a page of a book or breaking a sheet of glass. In the field of such video special effect processing, it is recently desired to perform video special effect processes on video signals which allow scenes to be switched in a more impressive manner.

It is an object of the present invention to provide a device and a method for generating read addresses for a video memory which generate read address signals for switching scenes in a more impressive manner.

SUMMARY OF THE INVENTION

In order to achieve the above-mentioned object, according to the present invention, in a read address generator for generating read address signals for a video memory, input read addresses indicated using an orthogonal coordinate system are converted into equivalent addresses in a polar coordinate system; the polar coordinate system is divided into blocks on the basis of distances from the pole of the polar coordinate system; vectors having sequentially increasing or decreasing angles are respectively set for those blocks; coordinate values in the polar coordinate system indicated by such vectors are converted into second equivalent coordinate values in the orthogonal coordinate system; and output read addresses are generated by subtracting the second coordinate values from the input read addresses indicated using the orthogonal coordinate system, and are supplied to the video memory.

DETAILED DESCRIPTION OF THE PREFERRED EMBODIMENT

Figure 1:
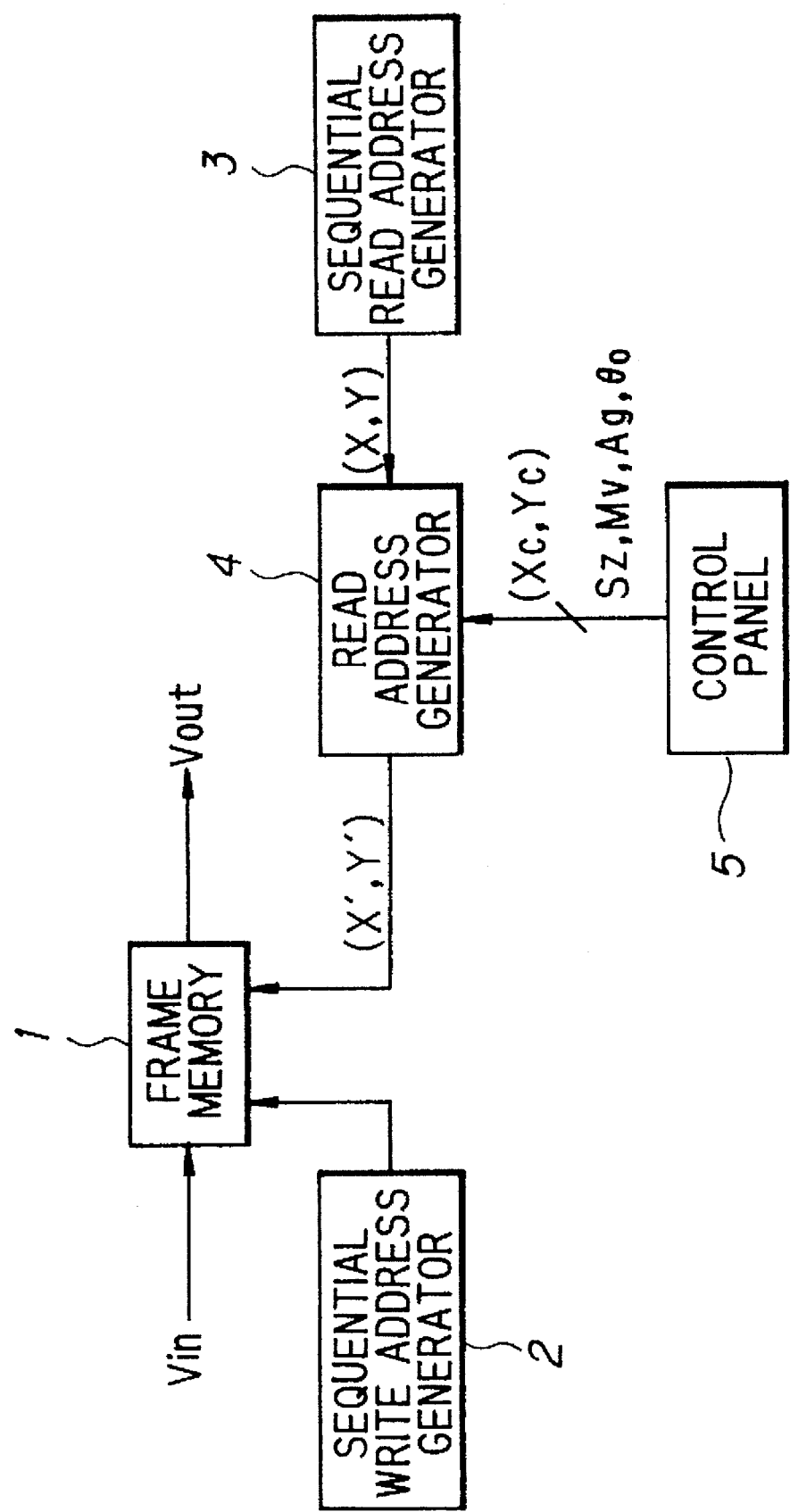
FIG. 1 is a block diagram showing an embodiment of a read address generator according to the present invention

FIG. 1 shows a video special effect apparatus to which the present invention is applied. In FIG. 1, 1 designates a frame memory as an image memory. A digital input video signal Vin is supplied to the memory 1 as a write signal, and writing is performed on the basis of write addresses sequentially generated by a sequential write address generator 2.

Read addresses (X, Y) which are sequentially generated by a sequential read address generator 3 are processed by a read address generator 4 in accordance with various data supplied by a control panel 5. According to the processed read addresses (X', Y'), the frame memory 1 is randomly read to obtain an output video signal Vout.

Figure 2:
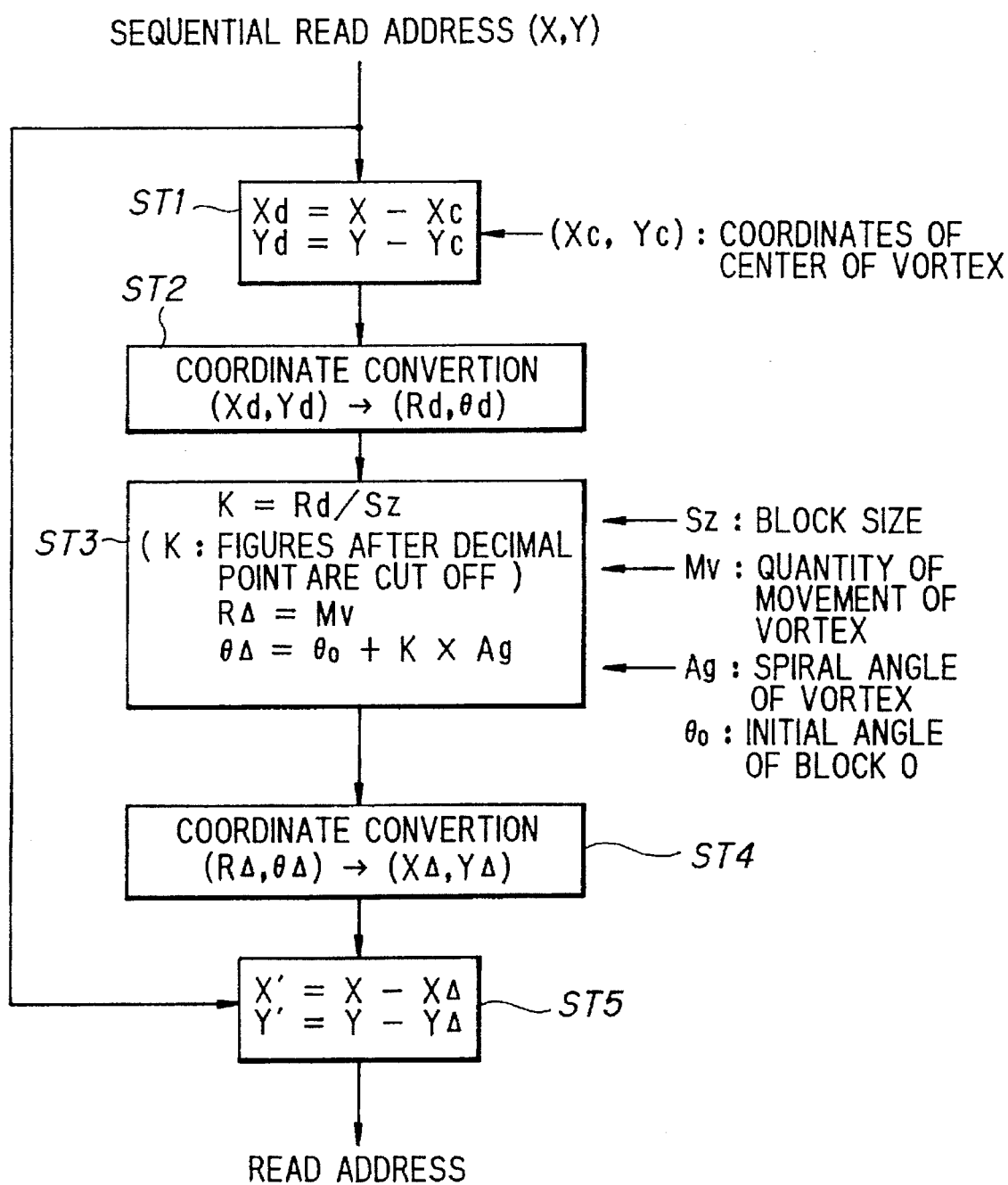
FIG. 2 is a flow chart for explaining the operation of the read address generator shown in FIG. 1.

As described above, the read addresses (X', Y') are formed in read address generator 4 based on the sequential read addresses (X, Y). FIG. 2 shows the flow of the process performed by the read address generator 4.

First, the origin is moved to the coordinates (Xc, Yc) of the center of a vortex supplied by the control panel 5 relative to the sequential read addresses (X, Y) at step ST1. Specifically, calculations $Xd=X-Xc$ and $Yd=Y-Yc$ are made, new coordinates being expressed by (Xd, Yd).

Next, the orthogonal coordinates (Xd, Yd) are converted into polar coordinates (Rd, θd) at step ST2. Distances from the pole, i.e. distance Rd from the coordinates (Xc, Yc) of the center of the vortex is calculated using the following equation.

$$Rd=\sqrt{(Xd^2+Yd^2)}=\sqrt{\{(X-Xc)^2+(Y-Yc)^2\}}$$

Next, step ST3 determines the orders of the places which the blocks k corresponding to the read addresses (X, Y) occupy in the image, on the basis of the distances Rd using block sizes Sz supplied by the control panel 5. Specifically, the following calculation is made.

$$K=Rd/Sz \quad (K; \text{figures after the decimal point are cut off})$$

Vectors of the movement (RΔ, θΔ) are calculated on the polar coordinate system based on the quantity of movement of the vortex Mv supplied by the control panel 5, the spiral angle of the vortex Ag, and the initial angle $\theta_0$ of a block 0. Rθ and θΔ are calculated as follows.

$$R\Delta=Mv$$

$$\theta\Delta=\theta_0+K\times Ag$$

Next, the vectors of movement (RΔ, θΔ) are converted into orthogonal coordinates (XΔ, YΔ). Calculations $X\Delta=R\Delta\times\cos\theta\Delta$ and $Y\Delta=R\Delta\times\sin\theta\Delta$ are made at step ST4.

At step ST5, the following calculations are made to obtain read addresses (X', Y').

$$X'=X-X\Delta$$

$$Y'=Y-Y\Delta$$

Figure 3:
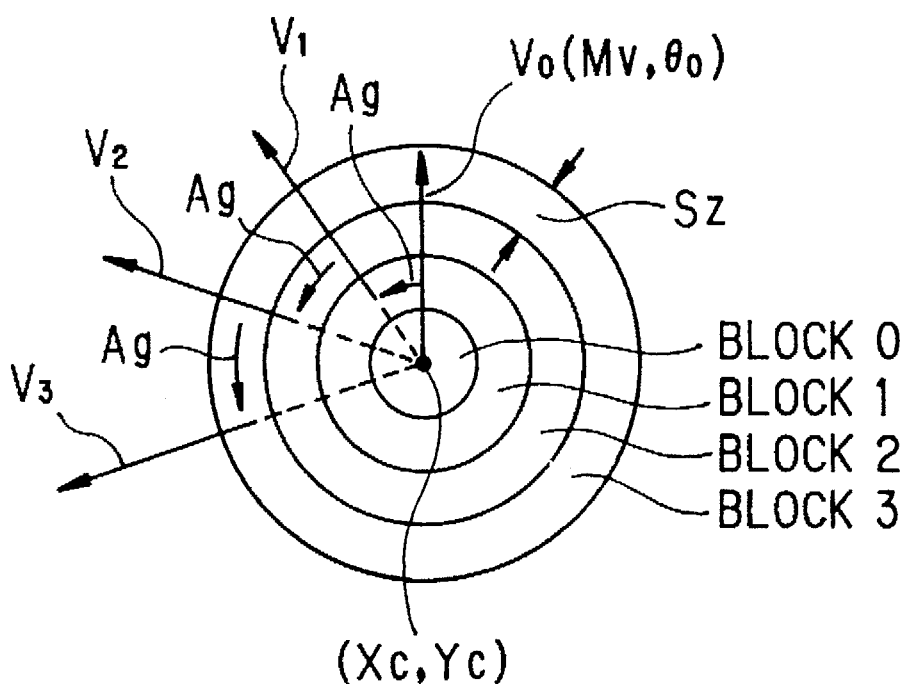
FIG. 3 is a schematic line diagram for explaining parameters used in the read address generator shown in FIG. 1.

FIG. 3 shows the relationship between the coordinates of the center (Xc, Yc) of the vortex supplied by the control panel 5, the block sizes Sz, the quantity of movement My, the spiral angle of the vortex Ag, the initial angle $\theta_0$ of the block 0, and vectors of movement $V_0$, $V_1$, $V_2$, $V_3$, etc. of blocks 0, 1, 2, 3, etc. on the orthogonal coordinates (X, Y).

Figure 4:
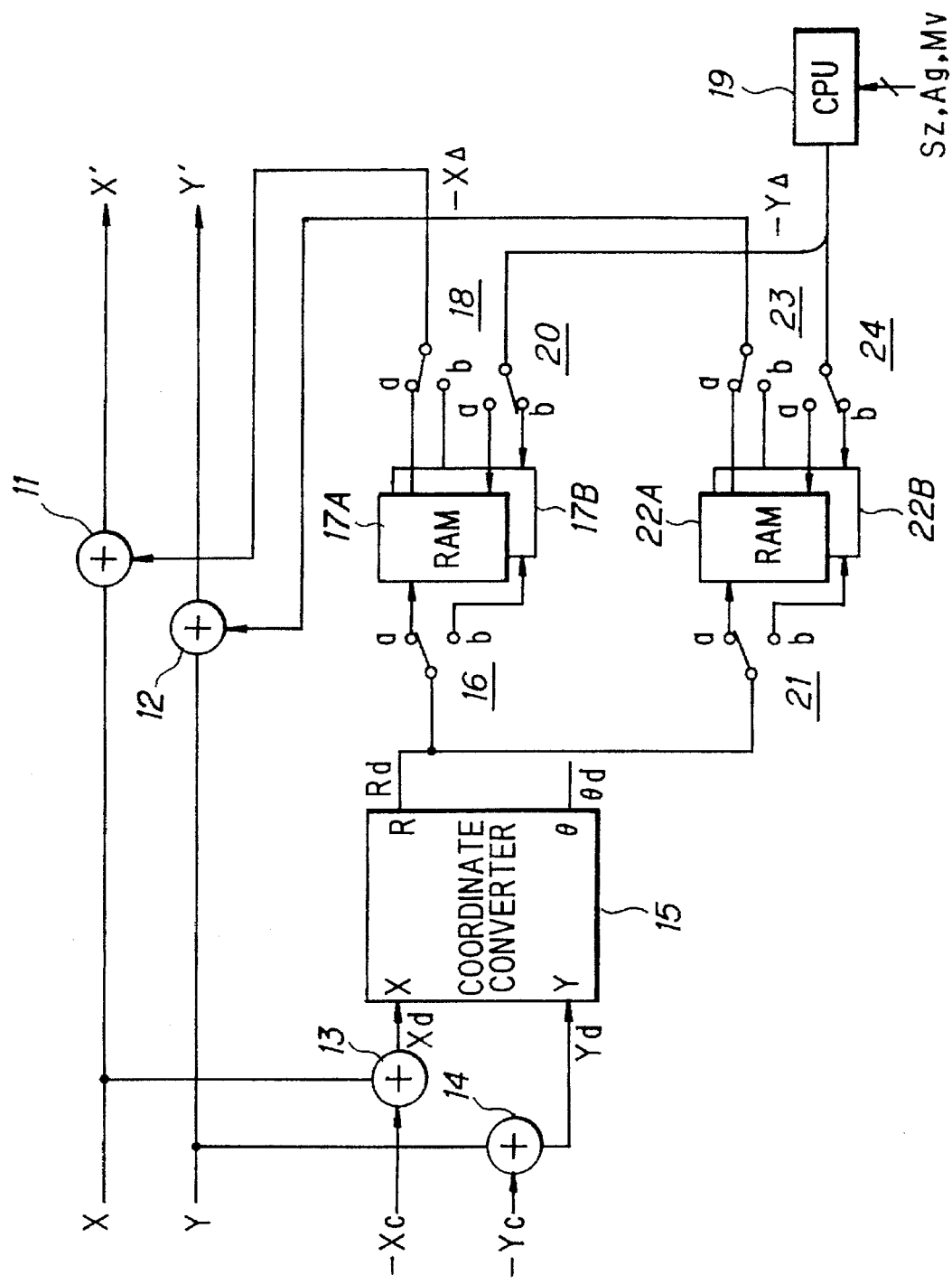
FIG. 4 is a block diagram showing the configurations of major parts of the read address generator shown in FIG. 1.

FIG. 4 shows an example of the configuration of the read address generator 4 for implementing the above-described process flow in FIG. 2.

In FIG. 4, the data for X and Y for the sequential read addresses (X, Y) are supplied to adders 11 and 12, respectively. The data of X and Y are also supplied to adders 13 and 14, respectively. Data −Xc and −Yc corresponding to the coordinates (Xc, Yc) of the center of the vortex are supplied to the adders 13 and 14, respectively. Data Xd (=X−Xc) and Yd (=Y−Yc) output by the adders 13 and 14 are supplied to a coordinate converter 15. The coordinate converter 15 is constituted by, for example, a ROM table and converts the orthogonal coordinates (Xd, Yd) into the polar coordinates (Rd, θd).

The data of the distances Rd from the center of the vortex output by the coordinate converter 15 are supplied through an a-position and a b-position of a change-over switch 16 to RAM tables 17A and 17B as read addresses. The tables 17A and 17B are for obtaining data −XΔ. The data −XΔ read from the tables 17A and 17B are supplied through an a-position and a b-position of a change-over switch 18 to the adder 11.

The change-over switches 16 and 18 are connected to the a-position for odd-numbered fields and to the b-position for even-numbered fields. Therefore, the data −XΔ are read from the table 17A in odd-numbered fields while the data −XΔ are read from the table 17B in even-numbered fields. The data −XΔ corresponding to the distances Rd are supplied by a CPU 19 and are written in the table which is not in the read-state in each field. Specifically, the data −XΔ corresponding to various values of the distance Rd are supplied by the CPU 19 through an a-position and a b-position of a change-over switch 20 to the tables 17A and 17B and are sequentially written in the addresses corresponding to the distances Rd. The change-over switch 20 is connected to the b-position for odd-numbered fields and to the a-position for even-numbered fields.

The CPU 19 calculates the vectors of movement (RΔ, θΔ) based on the quantity of the movement of the vortex Mv, the spiral angle of the vortex Ag, and the initial angle $\theta_0$. The vectors are converted into orthogonal coordinates (XΔ, YΔ) to form the data −XΔ and −YΔ. In other words, the CPU 19 performs the steps ST3 and ST4 in the process flow shown in FIG. 2.

The data of the distances Rd output by the coordinate converter 15 are supplied through an a-position and a b-position of a change-over switch 21 to RAM tables 22A and 22B as read addresses. The tables 22A and 22B are for obtaining data −YΔ. The data −YΔ read from the tables 22A and 22B are supplied through an a-position and a b-position of a change-over switch 23 to the adder 12.

The change-over switches 21 and 23 are connected to the a-position for odd-numbered fields and to the b-position for even-numbered fields. Therefore, the data YΔ are read from the table 22A in odd-numbered fields while the data −YΔ are read from the table 22B in even-numbered fields. The data −YΔ corresponding to the distances Rd are supplied by the CPU 19 and are written in the table which is not in the read-state in each field. Specifically, the data −YΔ corresponding to various values of the distance Rd are supplied by the CPU 19 through an a-position and a b-position of a change-over switch 24 to the tables 22A and 22B and are sequentially written in the addresses corresponding to the distances Rd. The change-over switch 24 is connected to the b-position for odd-numbered fields and to the a-position for even-numbered fields.

Since the data −XΔ and −YΔ are respectively supplied to the adders 11 and 12 as described above, these adders 11 and 12 outputs the data of X' (=X−XΔ) and Y' (=Y−YΔ) of read addresses (X', Y').

As described above, in the present embodiment, a special effect to show an explosion in the form of a vortex can be provided on an image displayed in accordance with a video signal Vout by reading a video signal from the frame memory 1 according to read addresses (X', Y') generated by the read address generator 4. It is therefore possible to erase the previous picture, with an explosion in the form of a vortex displayed, thereby switching scenes in a more impressive manner.

Figure 5A:
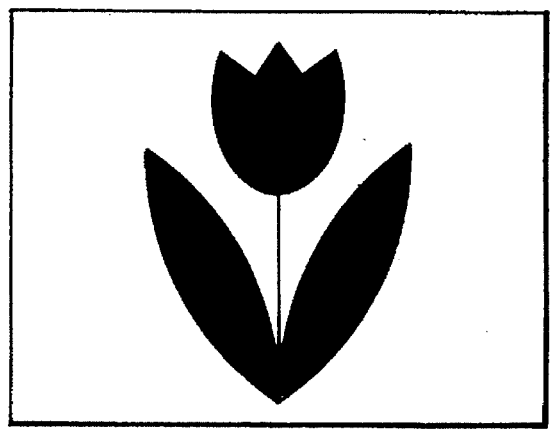
FIG. 5A through FIG. 5C are schematic line diagrams for explaining a vortex-like explosion effect realized by the read address generator shown in FIG. 1.
Figure 5B:
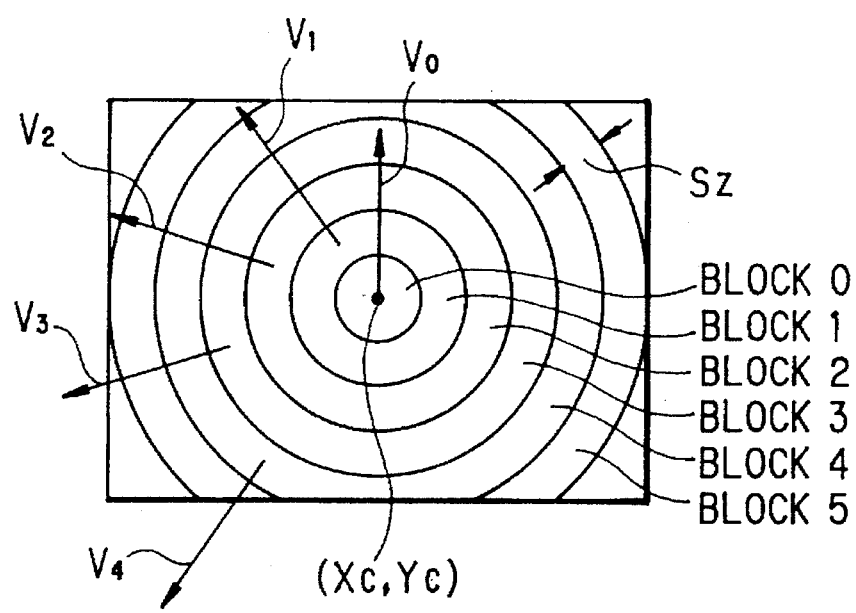
Figure 5C:
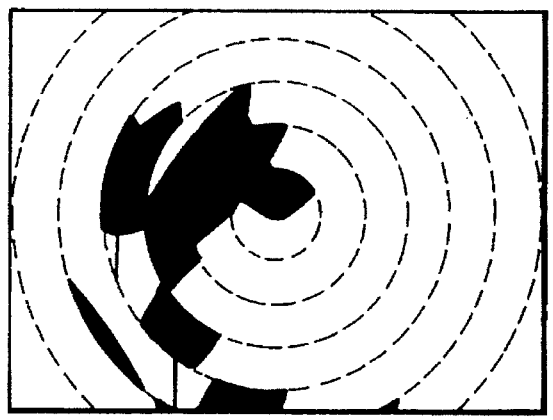

For example, if an image according to a video signal Vin is as shown in FIG. 5A and is divided into blocks as shown in FIG. 5B and vectors of movement $V_0$, $V_1$, $V_2$, etc. are set for blocks 0, 1, 2, etc., an image according to a video signal Vout is as shown in FIG. 5C in which the effect of a vortex-like explosion can be seen.

Figure 6A:
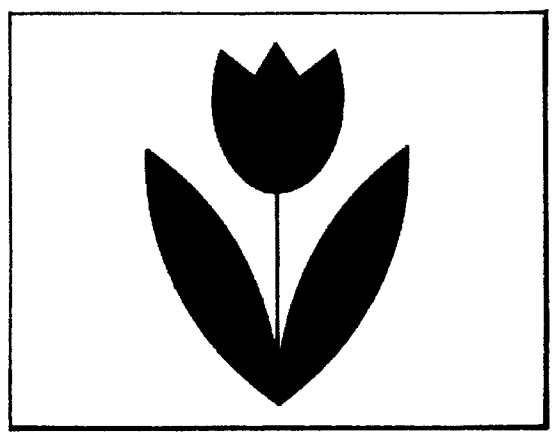
FIG. 6A through FIG. 6C are schematic line diagrams for explaining a vortex-like explosion effect realized by the read address generator shown in FIG. 1.
Figure 6B:
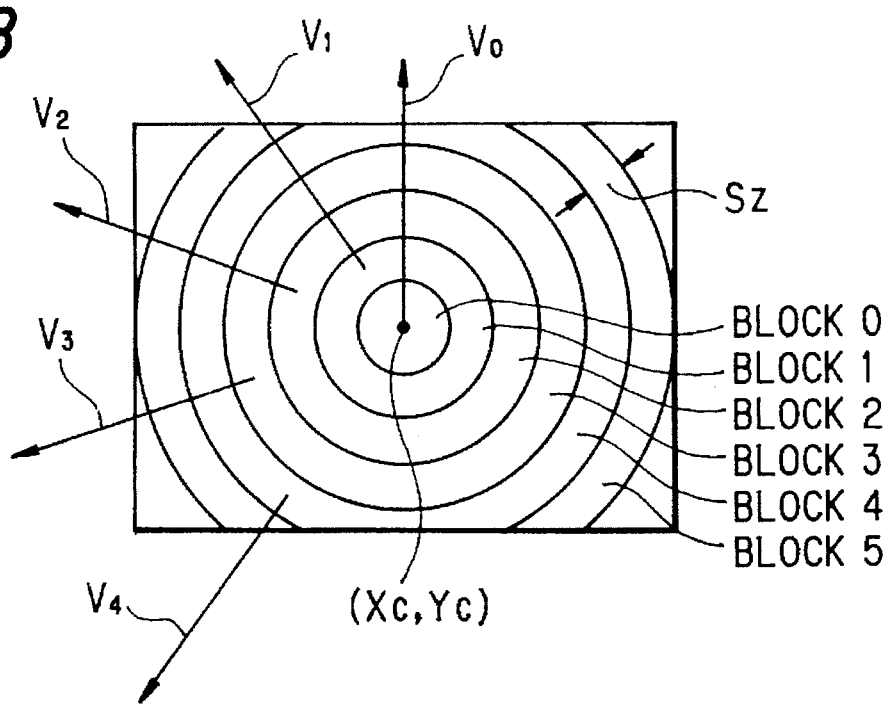
Figure 6C:
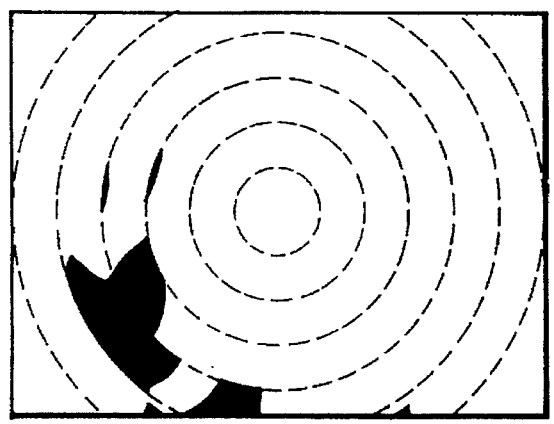

If an image according to a video signal Vin is as shown in FIG. 6A and is divided into blocks as shown in FIG. 6B and vectors of movement V0, V1, V2, etc. are set for blocks 0, 1, 2, etc., an image according to a video signal Vout is as shown in FIG. 6C in which the effect of a vortex-like explosion can be seen.

In the example shown in FIG. 6, the spiral angle of the vortex Ag is the same as that in FIG. 5 but the quantity of movement (the magnitude of the vector of movement) is greater than that in the example in FIG. 5. With the quantity of movement thus increased, the quantity of dispersion to the neighborhood is increased and, therefore, it is possible to switch the scene by erasing the previous picture while showing an explosion in the form of a vortex by continuously increasing the quantity of movement Mv.

Although the block size Sz is fixed in the above-described embodiment, adjustment can be made so that the sizes of the blocks become nonuniform by adding random values (random numbers) to the block size Sz. While the magnitude of the vectors of movement Mv for the blocks is fixed in the above-described embodiment, nonuniformity can be added to the manner in which dispersion proceeds by adding random values (random numbers) to the magnitude of the vectors of movement. It is thus possible to achieve a more impressive effect by controlling the randomness of the block size Sz and the magnitude of the vectors of movement Mv. In addition, although the spiral angle Ag of a vortex is fixed in the above-described embodiment, a random value (random number) may be added to the spiral angle Ag.

In the embodiment shown in FIG. 1, sequential read addresses (X, Y) are input to the read address generator 4 by the read address generator 3. A configuration may be employed, wherein addresses ($X_{3D}$, $Y_{3D}$) obtained by converting the read addresses (X, Y) using the three-dimensional conversion matrix formula as shown below are input. In the three-dimensional conversion matrix formula, all through $a_{33}$ are elements in the three-dimensional conversion matrix.

$$X_{3D} = (a_{11} \cdot X + a_{12} \cdot Y + a_{13})/(a_{31} \cdot X + a_{32} \cdot Y + a_{33})$$

$$Y_{3D} = (a_{21} \cdot X + a_{22} \cdot Y + a_{23})/(a_{31} \cdot X + a_{32} X + a_{32} \cdot Y + a_{33})$$

According to the present invention, input read addresses indicated using orthogonal coordinates are first converted into polar coordinates: the polar coordinate system is divided into blocks according to distances from the polar of the polar coordinate system; vectors of movement having sequentially increasing or decreasing angles are generated for the blocks; and the vectors of movement are converted into orthogonal coordinates which are subtracted from the input read addresses to obtain output read addresses. This makes it possible to provide an image according to a video signal read from an image memory with a special effect to display an explosion in the form of a vortex thereon. As a result, scenes can be switched in a more impressive manner by erasing the previous picture with the explosion in the form of a vortex displayed.

It will be understood that the foregoing disclosure is intended to be merely exemplary, and not to limit the scope of the present invention which is to be determined by reference to the appended claims.

What is claimed is:

1. A read address generator for generating read addresses for a read memory comprising:

first conversion means for converting input read addresses indicated using an orthogonal coordinate system into equivalent addresses in a polar coordinate system;

means for dividing said polar coordinate system into blocks according to distances from the pole of said polar coordinate system, said blocks being concentric and having radial widths that are controlled on the basis of values obtained by adding random values to a reference value;

vector setting means for setting vectors for said blocks, the angles of said blocks in said polar coordinate system sequentially increasing or decreasing;

second conversion means for converting coordinate values indicated by said vectors into coordinate values in the orthogonal coordinate system; and means for generating output read addresses by subtracting said coordinate values from said input read addresses indicated in said orthogonal coordinate system and for supplying said output read addresses to said video memory.

2. The read address generator according to claim 1, wherein the size of the vectors for said blocks is fixed.

3. The read address generator according to claim 1, wherein the sizes of the vectors for said blocks are obtained by adding random values to a reference value.

4. The read address generator according to claim 1, wherein the angles of the vectors for said blocks vary at a fixed rate.

5. The read address generator according to claim 1, wherein the rate at which the angles of the vectors for said blocks vary is controlled on the basis of values obtained by adding random values to a reference value.

6. A method of generating read addresses for a video memory comprising the steps of:

converting input read addresses indicated using an orthogonal coordinate system into equivalent addresses in a polar coordinate system;

dividing said polar coordinate system into blocks according to distances from the pole of said polar coordinate system, said blocks being concentric and having radial widths that are controlled on the basis of values obtained by adding random values to a reference value;

setting vectors for said blocks, the angles of said blocks in said polar coordinate system sequentially increasing or decreasing;

converting coordinate values indicated by said vectors into coordinate values in the orthogonal coordinate system; and generating output read addresses by subtracting said coordinate values from said input read addresses indicated in said orthogonal coordinate system and for supplying said output read addresses to said video memory.

7. The read address generator according to claim 1, wherein the blocks are concentric and circular in shape.

8. The method of claim 6, wherein the blocks are concentric and circular in shape.

* * * * *